United States Patent [19]

Wasala et al.

[11] 4,193,776
[45] Mar. 18, 1980

[54] METHOD FOR THE PURIFICATION OF THE PROCESS CONDENSATE FROM SYNTHESIS GASES AND HYDROGEN PLANT

[75] Inventors: Tadeusz Wasala; Marek Dmoch; Henryk Jozwiak, all of Pulawy, Poland

[73] Assignee: Instytut Nawozow Sztucznych, Pulawy, Poland

[21] Appl. No.: 16,313

[22] Filed: Feb. 28, 1979

[30] Foreign Application Priority Data

Mar. 3, 1978 [PL] Poland ............................... 205094

[51] Int. Cl.² ............................................. B01D 19/00
[52] U.S. Cl. .......................................... 55/49; 55/54; 252/373; 252/376; 261/96; 261/157; 261/DIG. 76
[58] Field of Search ................. 55/44, 46, 49, 54, 198; 252/373–376; 261/94–98, 157, DIG. 76; 423/650, 651

[56] References Cited

U.S. PATENT DOCUMENTS

| 3,725,270 | 4/1973 | Tassoney et al. ............... 252/373 X |
| 3,816,332 | 6/1974 | Marion ............................... 252/373 |
| 4,141,696 | 2/1979 | Marion et al. ..................... 252/373 |
| 4,150,953 | 4/1979 | Woodmansee ................. 261/98 X |

FOREIGN PATENT DOCUMENTS 1416920 12/1975 United Kingdom ...................... 55/54

Primary Examiner—Thomas G. Wyse
Assistant Examiner—Richard W. Burks

[57] ABSTRACT

The object of the invention is a method for the purification of the process condensate from synthesis gases or hydrogen plant.

The process condensate is purified from contaminations dissolved in it by stripping it with process steam before it is used in the chemical process of the raw material conversion into hydrogen or synthesis gas at the pressure that is equal or higher than the pressure of this conversion process. The total steam containing volatile products of the process condensate degassing is recycled to the gas generation process and the process condensate is eventual transported to the water treatment station before using it as boiler feed water.

3 Claims, 1 Drawing Figure

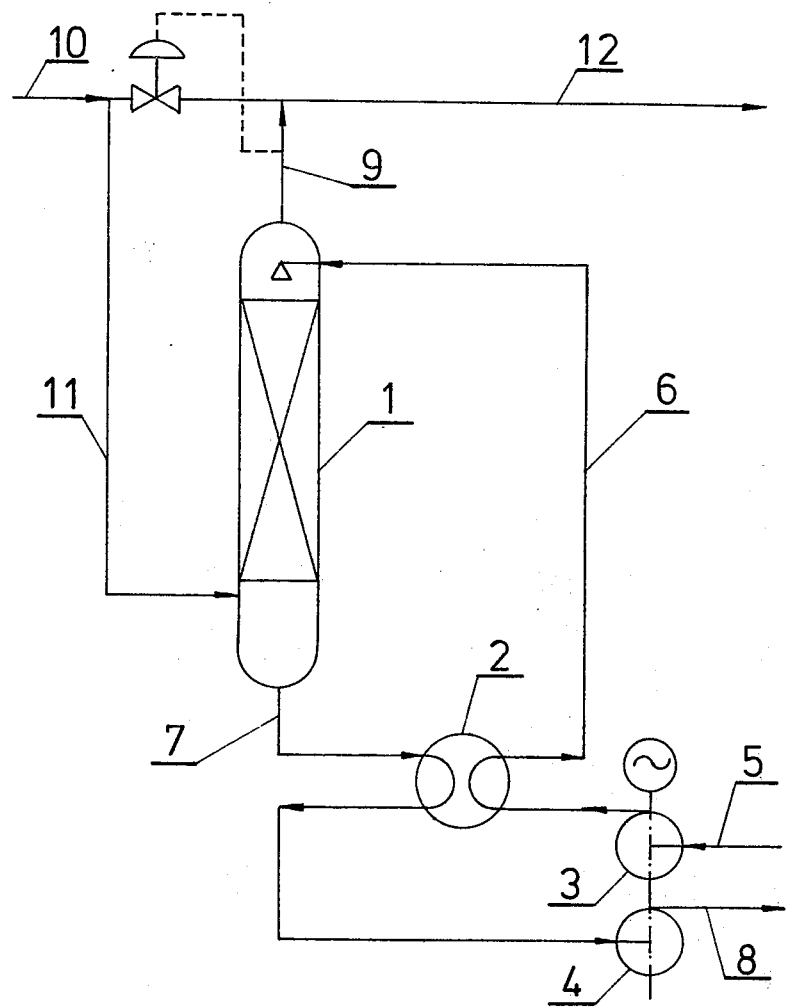

METHOD FOR THE PURIFICATION OF THE PROCESS CONDENSATE FROM SYNTHESIS GASES AND HYDROGEN PLANT

The object of this invention is a method for the purification of the process condensate, which is formed in the generation of hydrogen or other hydrogen rich gases used in various chemical syntheses eg. ammonia, methanol or oxosynthesis.

In synthesis gas plants, steam is used for chemical conversion of the main raw material (feedstock) such as natural gas, naphta, coal and others. Normally, a high excess of steam is required in relation to the requirements of stoichiometry, since high conversion of the main raw material is necessary. The synthesis gas thus obtained contains a considerable amounts od steam, which in spite of the further treating, should be removed from it. This is done by cooling down the gas below its dew point. The excess of steam contained in the gas is condensed and separated out as process condensate. The process condensate contains some amounts of components of the synthesis gas, that have been dissolved in water such as carbon dioxide, hydrogen, nitrogen, carbon monoxide, methan. Beside these, other substances are also present in the process condensate, such as ammonia, methanol, formaldehyde and other simple organic compounds. Since these substances are formed as by-products during production and purification stages of the synthesis gas. All the substances mentioned above present in the condensate are volatile ones. The process condensate contains also the trace amounts of some unvolatile substances e.g. iron nickel, copper, zinc. The syntesis gas obtained from coal or heavy oils contains additionally various less volatile and heavier organic and inorganic compounds (compounds of sulphur, nitrogen, sodium etc.). Various possibilities of utilizing the process condensate exist, but the most favourable one is to reuse it, after purification, as boiler feed water. The using of the process condensate for this purpose is impossible without special treatment and removing of the substances dissolved in it, due to the high purity requirements of boiler feed water.

There are known viarious methods for the purification of process condensate depending on the further application. In case of low and medium steam boilers, the required degree of condensate purification is obtained by the initial decompression of the process condensate and then by degassing, blowing of low pressure steam or air or nitrogen through it (in a scrubber) and venting off contaminations together with the blowing medium into the atmosphere. If the process condensate is used as a boiler feed water in high pressure steam boilers, such degassing is not always sufficient thus the additional purification on ion exchangers is required and it is carried out in specially selected and designed reactors with ion sorbents (resins).

All the known methods described above have one substantial disadvantage in common, none of the mentioned admixtures dissolved in the process condensate can be utilized, and they may pass either into the atmosphere or process effluents thus creating the pollution problems in the environment. Moreover, $NH_3$, $CO_2$ and other volatile substances contained in the process condensate create operational troubles in the final stage of water purification plant using ion exchangers.

In spite of strictly obeying the principles of the environmental protection, methods have been developed, which enable the removing of admixtures from the process condensate and recycling them back for reusing in the synthesis gas preparation process. There is a known method which is based on the distillation of the process condensate in a column or a scrubber. The distillate containing the most of volatile components (at their much higher concentrations) is recycled into the synthesis gas generation stage, and the bottoms product after being additionally passed through ion exchangers, is used as a boiler feed water. The disadvantages of this method are high costs of the distillation process of very dilluted solutions.

Moreover, prior to the distillation an expansion step of the process condensate is usally realized, wherein part of its admixtures escapes to the atmosphere.

The other known method for the preliminary purification of the process condensate with utilizing the admixtures contained in it for gas generation, is the removing of the volatile components from the process condensate by stripping using natural gas or air for this purpose in a countercurrent packed towers. This method is also known in the state of art as a saturation method due to the fact that a medium (air or natural gas) used for blowing through (stripping) is saturated with steam during this process. The media used for blowing through, such as those mentioned above are not the most suitable ones. Firstly, they may contain components which are also present in the process condensate and what makes it impossible to separate them fully from the condensate. Secondly, they are frequently contaminated themselves, and the contaminations, if not volatile, are wholly passed into the preliminary purified condensate. Thirdly, they require a complex saturation system and are expensive, especially in case of the process condensate, obtained from plants for synthesis gas production from coal or heavy naphta products, that must be purified.

It is possible to avoid any of the disadvantages above mentioned, to protect the environment fully against pollution, and to obtain the process condensate of high purity free from any its contaminations and with using those in the gas production process, if the method of this invention is used wherein the degassing process is carried out at a suitable hihg temperature and by mean of a pure medium that does not contain any components soluble in the process condensate.

According to this invention, the process condensate from hydrogen or other synthesis gas plant, after being initially heated up, is stripped with a part or total amount of the process steam being used in the chemical process of raw materials conversion into hydrogen or synthesis gas (prior to it entering into the processing reactor) and after removing the volatile contaminations and cooling it down, is transported if needed to the water treatment station and the total amount of steam leaving the stripping stage containing volatile products of degassing the process condensate is transported to the gas generation process wherein the raw material is converted into hydrogen or synthesis gas. The stripping of the process condensate is carried out at the pressure that is equal or hogher than the pressure of the raw material conversion process into hydrogen or synthesis gas, but not lower than 5 ata. This creates sufficiently high temperature for degassing of the process condensate and provides good removing of the admixtures which after returned back with the steam are decomposed under conditions existing during the generation synthesis gas and are the useful compoments for it. In case of the process condensate received from coal gassification or heavy oils process, the invention enables to decrease the purification costs of condensate with utilizing some of the substances contained in it as a supplement of the main raw material. When the purification of the process condensate is carried out according to this invention, in a continuous way, full protection of the environment against pollution is achieved.

The invention is explained more clearly by on exemple of its realization. The flow sheet diagram shown in the attached drawing refers to the purification of the process condensate from an ammonia synthesis plant of the capacity 1500 t/d using natural gas as a raw material.

EXAMPLE

The process condensate is fed at the rate of 100000 kg/h via pipeline 5 and pump 3 to heat exchanger 2 and further on by means of pipeline 6 to the top of the stripping tower 1. In heat exchanger 2 the condensate is initially heated up to the temperature that is very close to the boiling temperature of water under the pressure prevailing in the stripping tower 1. The superheated steam necessary to the process with the temperature of 385° C. is fed to the plant via pipeline 10. Part of that steam is delivered through pipeline 12 directly to the reactor to reform natural gas into ammonia synthesis gas, and the second one at the rate of 20000 kg/h is fed to the bottom of the stripping tower 1 via pipeline 11.

The stripper 1 operates at the pressure of 25 at abs. The steam comes counter-currently into contact with the process condensate flowing downward through the packed of the stripping column 1. Under such conditions, the volatile componente are stripped off from the process condensate and together with the steam escape from the stripper through line 9. The steam leaving the stripping column 1 is mixed with the reminder steam from pipeline 10 and sent via pipeline 12 to the reforming reactor, which produces ammonia synthesis gas.

The purified process condensate is then discharged from the bottom of the stripping tower 1 via pipeline 7. The pure condensate is cooled down in heat exchanger 2 and gives off part of its heat content to heat up the contaminated process condensate. The purified condensate is discharged from the system via turbine 4 and pipeline 8 for the eventual further purification in the water treatment station. The turbine 4 is coupled to the pump 3 to cover either the whole or part of the pumping energy.

What we claim is:

1. In the invented method of purification of the process condensate from hydrogen and synthesis gas plants utilizing steam stripping, the stripping is carried out under pressure with a part or total amount of the process steam before it is used in the chemical process of conversion of the raw materials into hydrogen or synthesis gas and the total amount of steam leaving the stripping stage containing volatile products of degassing the process condensate is sent to the gas generating process.

2. In the said method according to the claim 1 the stripping of the process condensate from medium- and high pressure plants of the synthesis gas generation is carried out under a pressure equal to or higher than the pressure of the process of conversion of raw materials into hydrogen or synthesis gas.

3. In the said method according to the claim 1 the stripping of the process condensate from low pressure plants of the synthesis gas generation is carried out under a pressure higher than the pressure of the synthesis gas generation, preferably above 5 ata.

* * * * *